United States Patent [19]

Eldredge et al.

[11] Patent Number: 4,815,283

[45] Date of Patent: Mar. 28, 1989

[54] AFTERBURNER FLAMEHOLDER CONSTRUCTION

[75] Inventors: Donald W. Eldredge, Stuart; Billy R. Milam, Jupiter, both of Fla.

[73] Assignee: The United States of America as represented by the Secretary of the Air Force, Washington, D.C.

[21] Appl. No.: 66,154

[22] Filed: Jun. 25, 1987

[51] Int. Cl.[4] .................................................. F02K 3/10
[52] U.S. Cl. .......................................... 60/261; 60/749
[58] Field of Search .............. 60/749, 261, 264, 39.31, 60/39.32, 39.821, 39.826, 39.827; 239/127.1, 127.3

[56] References Cited

U.S. PATENT DOCUMENTS

| | | | |
|---|---|---|---|
| 2,702,452 | 2/1955 | Taylor et al. | 60/749 |
| 3,315,468 | 4/1967 | Vdoviak | 60/749 |
| 3,646,763 | 3/1972 | Arand | 60/261 |
| 3,765,178 | 10/1973 | Hufnagel et al. | 60/261 |
| 3,800,527 | 4/1974 | Marshall et al. | 60/39.72 |
| 4,259,839 | 4/1981 | Bayle Laboure et al. | 60/261 |
| 4,315,401 | 2/1982 | Beal et al. | 60/261 |
| 4,724,671 | 2/1988 | Lapergue et al. | 60/261 |

*Primary Examiner*—Louis J. Casaregola
*Assistant Examiner*—Timothy S. Thorpe
*Attorney, Agent, or Firm*—Richard J. Donahue; Donald J. Singer

[57] ABSTRACT

A flameholder for a gas turbine engine includes a retainer plate on the igniter holder boss which protrudes from the flameholder gutter and extends through a clearance hole in the outer shroud. The retainer plate permits thermally induced growth of the parts but does not allow the fuel spray and air flow gap near the igniter to increase significantly, thus assuredly maintaining a sufficiently rich fuel/air mixture to promote ignition.

5 Claims, 1 Drawing Sheet

U.S. Patent    Mar. 28, 1989    4,815,283
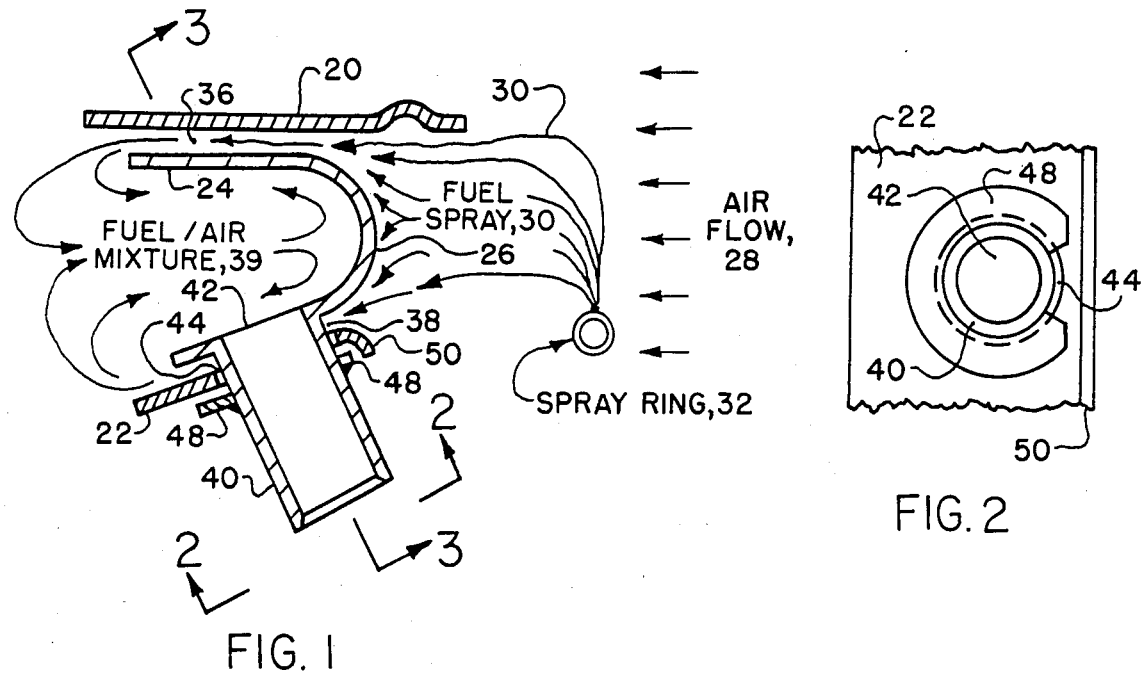
FIG. 1
FIG. 2
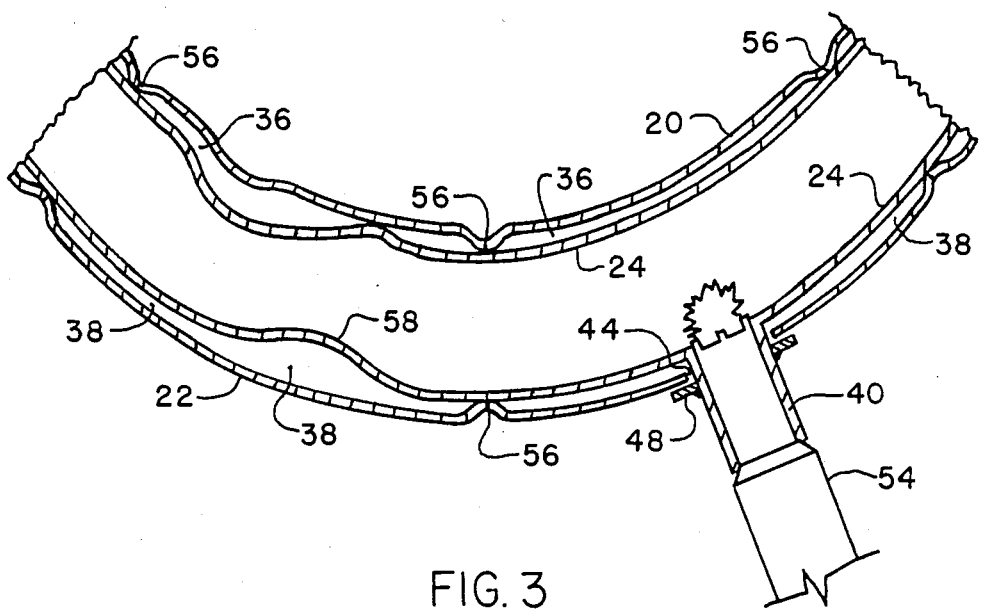
FIG. 3

AFTERBURNER FLAMEHOLDER CONSTRUCTION

STATEMENT OF GOVERNMENT INTEREST

The invention described herein may be manufactured and used by or for the Government for governmental purposes without the payment of any royalty thereon.

BACKGROUND OF THE INVENTION

This invention relates to improvements in flameholders used in conjunction with gas turbine engines having afterburners.

In such afterburners, fuel is injected into the hot gas stream generated by the engine to augment the energy level of the gas stream and thereby achieve additional thrust. The function of the flameholder is to establish a stabilized local combustion zone for the augmenting fuel.

Flameholders are generally ring-shaped and have inner and outer coaxial walls, called shrouds, which diverge from each other in the downstream direction of gas flow from the core engine. A flameholder gutter having a U-shaped (or V-shaped) cross section is positioned between the inner and outer shrouds, such that the apex, i.e., the outer surface of the U-shaped nose of the gutter, faces the upstream end of the flameholder. The flameholder is axially aligned with the exhaust opening from the core engine such that exhaust gases from the core engine, which gases includes vitiated air, are directed over the flameholder gutter. A fuel system, including a fuel spray ring, delivers a scheduled fuel supply to the zone immediately in front of the flameholder. A fuel igniter protrudes into the interior of the flameholder gutter and is held in positioned by a tubular boss which is welded to the exterior of the gutter and passes freely through a hole in the outer shroud of the flameholder.

The construction and operation of several embodiments of flameholders for gas turbine engines are disclosed in the following prior art patents, which patents are incorporated herein by reference:

U.S. Pat. No. 3,646,763, issued to J. K. Arand on Mar. 7, 1972;

U.S. Pat. No. 3,765,178, issued to R. H. Hufnagel et al on Oct. 16, 1973;

U.S. Pat. No. 3,800,527, issued to R. L. Marshall et al on Apr. 2, 1974;

U.S. Pat. No. 4,259,839, issued to G. J. Bayle Laboure et al on Apr. 7, 1981; and U.S. Pat. No. 4,315,401, issued to G. W. Beal et al on Feb. 16, 1982.

Flameholders of the type presently in use are known to be very effective devices. However, they are also known to be adversely affected and sometimes rendered inoperative in the circumstances described below.

Because of the severe weight limitations imposed on flameholders, they are usually made of thin sheet metal material. They must also operate in areas of extremely high temperatures at which the flameholder shrouds and gutter become warped. This warping is caused by the different expansions of the parts at local temperature hot spots.

Any methods used to rigidly attach the gutter to the outer shroud in the area where the igniter holder boss passes through the outer shroud will cause unnecessary stresses and a possible cracking of the flameholder. Therefore, the igniter holder boss is usually permitted to slide freely through a circular clearance hole in the outer shroud. The result is that the gap between the gutter and the outer shroud either increases or decreases with warpage, thus affecting the fuel/air mixture in this area.

If the flameholder gutter warps away from the outer shroud near the igniter location on the flameholder ring, as is the usual direction of warpage, then a larger gap is formed therebetween and the amount of vitiated air emitted by the turbine and introduced into the gutter near the igniter will increase. This in turn produces a leaner fuel/air mixture in the vicinity of the igniter and ignition of the mixture may not occur.

SUMMARY OF THE INVENTION

It is therefore the primary object of the present invention to provide a flameholder of improved construction and peerformance.

In accordance with the present invention, a flameholder for a gas turbine engine includes a retainer plate on the igniter holder boss which protrudes from the flameholder gutter. The retainer plate is affixed to the boss immediately outside of the clearance hole for the boss in the outer shroud. The retainer plate, while not impairing the thermally induced growth of the parts, does not allow the gap between the gutter and outer shroud to increase significantly in the vicinity of the igniter, thus always assuring a sufficiently rich fuel/air mixture to promote ignition.

BRIEF DESCRIPTION OF THE DRAWINGS

The invention will be more clearly understood by reference to the following detailed description of a preferred embodiment thereof in conjunction with the accompanying drawings, in which:

FIG. 1 is a partial cross section view taken longitudinally through a preferred embodiment of the flameholder of the present invention;

FIG. 2 is a view of the igniter holder boss and retainer plate as observed in the direction 2—2 of FIG. 1; and FIG. 3 is a cross section view of the flameholder taken through the line 3—3 of FIG. 1, and having an igniter installed in the igniter holder boss.

DETAILED DESCRIPTION OF THE INVENTION

Referring now to the drawings, it will be seen from the partial cross section of the flameholder ring shown in FIG. 1, that the flameholder has an inner shroud 20, an outer shroud 22, and a gutter 24 having a U-shaped nose portion 26. Air flow 28 from an associated gas turbine engine and fuel spray 30 emitted from a fuel spray ring 32 impinge upon the nose 26 of gutter 24, flow through the gap 36 formed between gutter 24 and the adjacent surface of inner shroud 20, and also flow through the gap 38 formed between gutter 24 and the adjacent surface of the outer shroud 22, to mix within the concave interior of gutter 24 and provide a desired fuel/air mixture 39 therein. A tubular igniter holder boss 40 has an end welded to a circular opening 42 in gutter 24. Igniter boss 40 extends through a clearance hole 44 formed through outer shroud 22, and has a retainer plate 48 welded thereto adjacent shroud 22.

FIG. 2 provides an end view of igniter holder boss 40 extending out of outer shroud 22 and having C-shaped retainer plate 48 welded to and enveloping most of the outer circumference of boss 40. As depicted in the preferred embodiment of the invention disclosed herein, retainer plate 48 is C-shaped in order not to interfere with the lip 50 formed at the end of the outer shroud 22. It should be mentioned however, that retainer plate 48 may take other shapes where space situations permit. For example, retainer plate 48 might take the shape of a washer-like disk which is affixed to and completely surrounds igniter holder boss 40. Retainer plate 48 functions to provide a bearing surface for outer shroud 22 adjacent clearance hole 44.

FIG. 3 is a cross section view taken through the line 3—3 of FIG. 1, and further illustrates an igniter 54 installed within igniter holder boss 40. In this view, it is possible to see that in this particular embodiment of the invention, gutter 24 is spot welded to inner shroud 20 and to outer shroud 22 at several points 56 located about the circumference of the flameholder.

As mentioned earlier, temperature induced stresses will cause gutter 24 to warp, usually inwardly and therefore away from the outer shroud 22, as shown in the area 58. This increases the gap therebetween and changes the fuel/air mixture in gutter 24 to a leaner mixture which may not assuredly be ignited. Retainer plate 48, however prevents this condition from occurring in the vicinity of the igniter 54 while not impairing the thermally induced growth of the parts in this vicinity. Should gutter 24 warp inwardly near the igniter boss 40, where they are not rigidly joined, retainer plate 48 will bear against outer shroud 22 near hole 44 and will force shroud 22 inwardly as well, and thus prevent any detrimental enlargement of the gap near the igniter 54. Any warpage of gutter 24 outwardly towards outer shroud 22 near igniter boss 40 is not detrimental to ignition of the fuel/air mixture.

While the invention has been particularly shown and described with reference to a preferred embodiment thereof, it will be understood by those skilled in the art that changes in form and details may be made therein without departing from the spirit and scope of the invention.

What is claimed is:

1. A flameholder for a gas turbine engine having an afterburner, said flameholder comprising:
   an inner shroud having a circular cross section;
   an outer shroud having a circular cross section, a clearance hole therethrough, and being spaced radially outwardly from and concentric to said inner shroud;
   said inner shroud and said outer shroud cooperating to define therebetween an annular inlet and an outlet;
   a ring-shaped gutter disposed between said inner shroud and said outer shroud, said gutter having a substantially U-shaped or V-shaped cross section with the apex thereof oriented toward said inlet, said gutter having a circular opening therethrough and cooperating with said outer shroud to define a gap therebetween;
   a tubular igniter holder boss having an end affixed about said opening in said gutter and extending through gap and through said clearance hole in said outer shroud;
   and retainer means affixed to said igniter holder boss external of said outer shroud for restricting the thermal enlargement of said gap in the vicinity of said igniter holder boss.

2. A flameholder as defined in claim 1 wherein said gutter is affixed to said inner shroud and to said outer shroud at a plurality of locations about the periphery of said gutter, and wherein said retainer means comprises a metallic plate affixed to the external surface of said igniter holder boss, said plate being positioned on said boss immediately adjacent the outer surface of said outer shroud and having at least a portion thereof extending beyond the periphery of said clearance hole in said outer shroud.

3. A flameholder as defined in claim 2 wherein said retainer means is a washer-like disk surrounding said igniter holder boss, said disk having an outer diameter greater than the diameter of said clearance hole in said outer shroud.

4. A flameholder as defined in claim 2 wherein said outer shroud has a lip extending radially outwardly at said outlet.

5. A flameholder as defined in claim 4 wherein said retainer means is a substantially C-shaped plate partially surrounding said igniter holder boss, the opening in said C-shaped plate facing said lip in said outer shroud.

* * * * *